United States Patent [19]
Groesswang

[11] Patent Number: 5,894,837
[45] Date of Patent: Apr. 20, 1999

[54] SOLAR COLLECTOR

[76] Inventor: Heinz Groesswang, Invalidengasse 10, A-4600 Wels, Austria

[21] Appl. No.: 09/029,271

[22] PCT Filed: Aug. 23, 1996

[86] PCT No.: PCT/EP96/03736

§ 371 Date: Feb. 23, 1998

§ 102(e) Date: Feb. 23, 1998

[87] PCT Pub. No.: WO97/08501

PCT Pub. Date: Mar. 6, 1997

[30] Foreign Application Priority Data

Aug. 24, 1995 [AT] Austria ................................ 1429/95

[51] Int. Cl.⁶ ................................................ F24J 2/24
[52] U.S. Cl. ................................ 126/666; 126/669
[58] Field of Search ........................... 126/666, 667, 126/668, 669, 674

[56] References Cited

U.S. PATENT DOCUMENTS

| 4,051,832 | 10/1977 | Stelzer | 126/666 |
| 4,156,419 | 5/1979 | Lewis | 126/667 |
| 4,265,225 | 5/1981 | Berger et al. | 126/669 |
| 4,271,818 | 6/1981 | Hastwell | 126/669 |

FOREIGN PATENT DOCUMENTS

| 33 12 364 | 11/1984 | Germany. |
| 93/15368 | 8/1993 | WIPO. |

*Primary Examiner*—Carroll B. Dority
*Attorney, Agent, or Firm*—Flynn, Thiel, Boutell & Tanis, P.C.

[57] ABSTRACT

A solar collector consists of extruded hollow metal sections in two layers joined together by parallel longitudinal webs, in which the open ends of the hollow sections are connected together in such a way that the heat carrier flows sinuously through said sections.

12 Claims, 2 Drawing Sheets

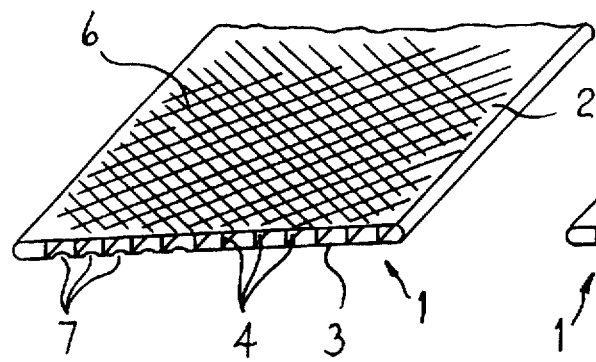
FIG. 1
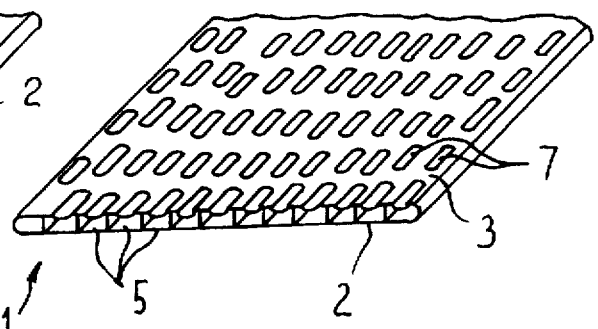
FIG. 2
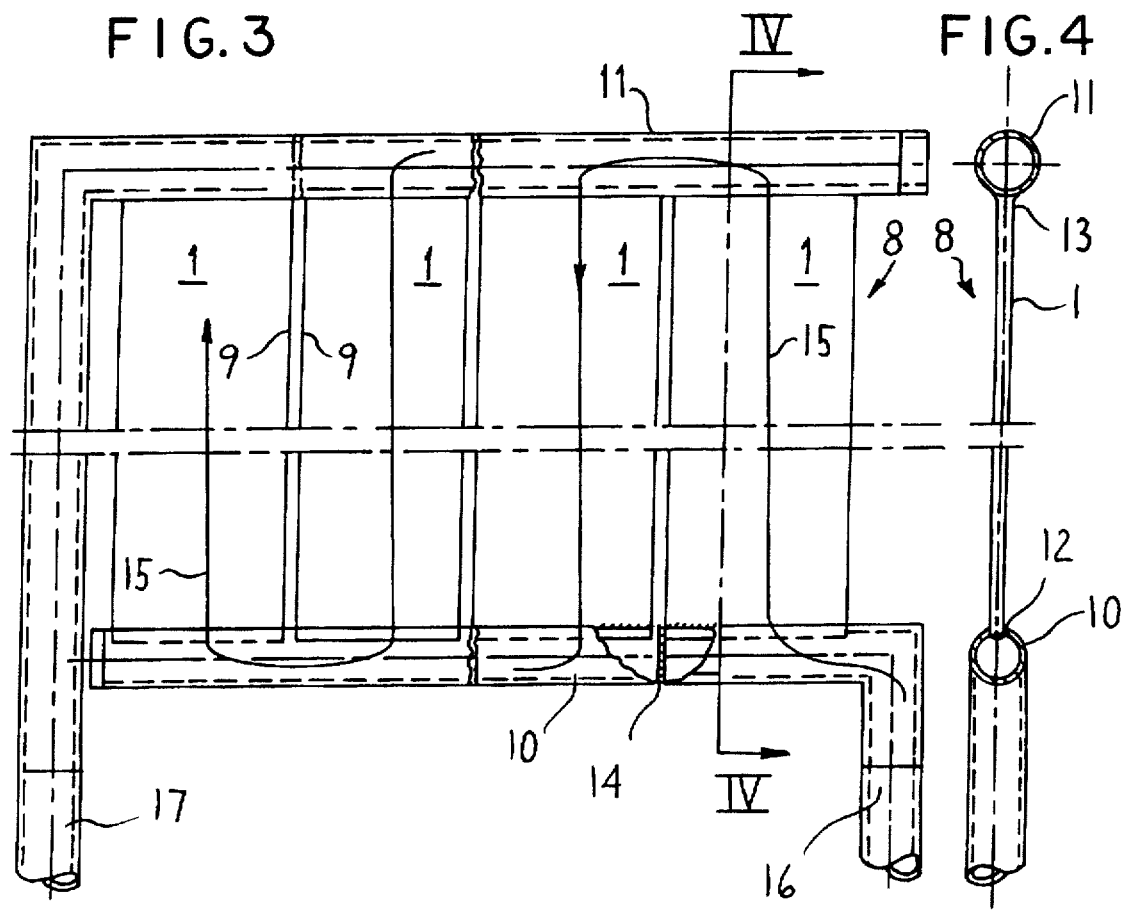
FIG. 3
FIG. 4

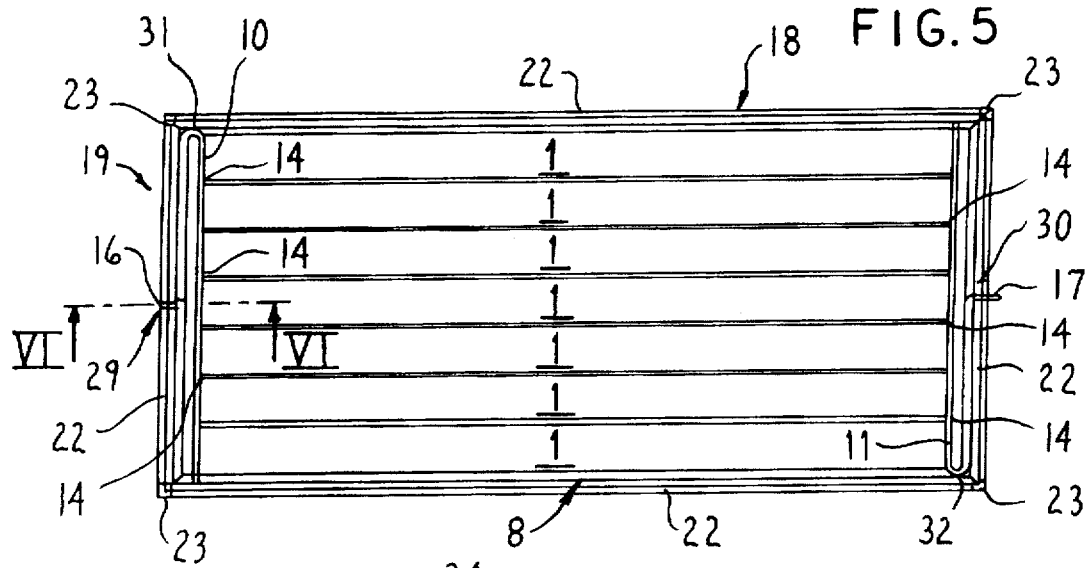
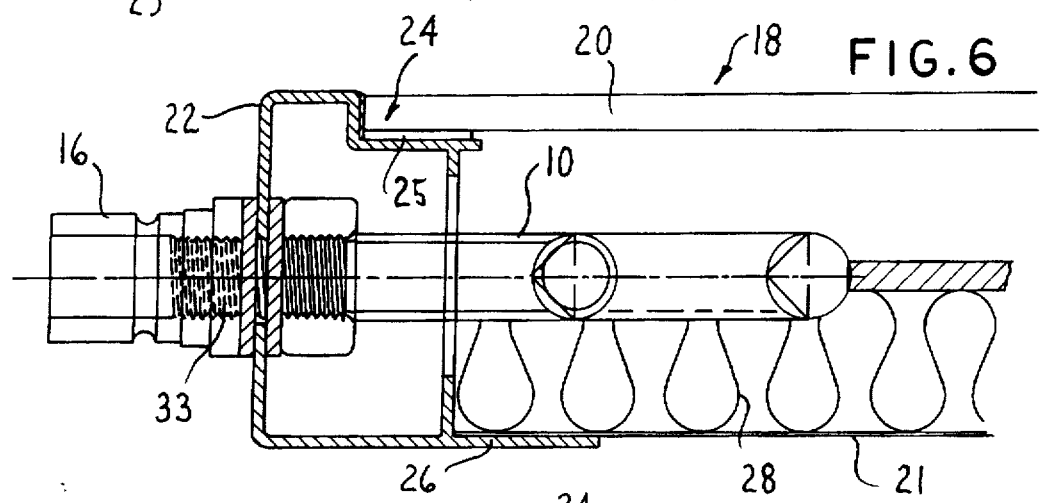
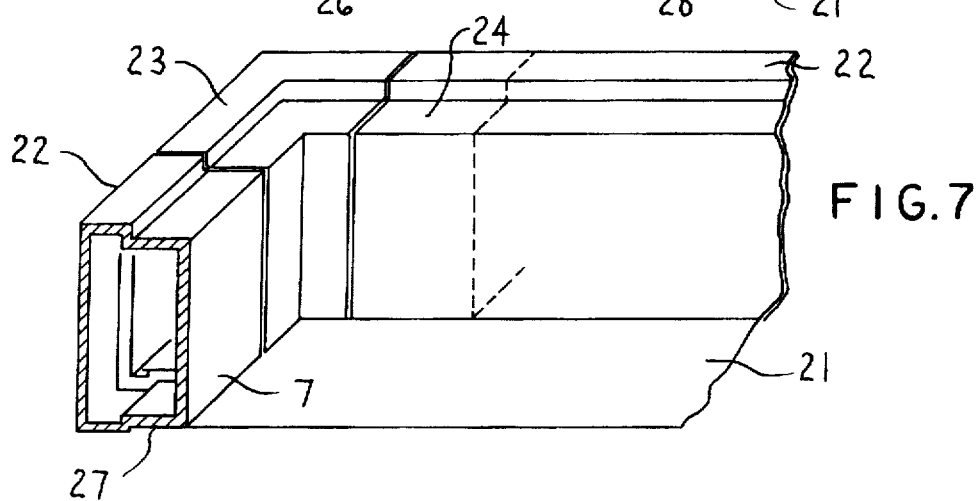

SOLAR COLLECTOR

This invention relates to a solar collector having a metal pipe system through which a heat carrier flows in serpentine fashion.

Such solar collectors are known. The pipe system through which the heat carrier (usually water) flows in serpentine fashion is formed by a serpentine copper pipe soldered onto a copper sheet. This unit is sprayed black on the upper side and disposed in a glass-covered frame with an insulating layer under the copper sheet. In order to utilize the spaces between the copper pipes at least partly for heat recovery one can additionally apply heat conducting plates to the copper pipes.

Because the contact surface and thus heat transfer surface between the copper sheet and the copper pipe is relatively small, the copper sheet heats up greatly in the known solar collector. This necessitates an elaborate insulating layer under the copper sheet, on the one hand, and causes the copper sheet to radiate part of the heat again, on the other hand.

WO93/15368 and U.S. Pat. No. 4,898,153 disclose solar collectors consisting of a hollow section plate made of transparent plastic, in particular polycarbonate. The hollow section plates consist of two layers connected by parallel longitudinal webs so as to form channels through which a heat carrier flows which is mixed with a solar absorbent material, for example a dark color. There is a danger of part of the color settling in the hollow section, thereby heating the plastic hollow section but not the heat carrier.

The problem of the invention is to provide a simply constructed solar collector with high efficiency.

This is obtained according to the invention by the solar collector characterized in claim 1. Advantageous embodiments of the invention are rendered in the subclaims.

The inventive solar collector is produced from plate-shaped metal hollow section portions. The metal hollow section consists of two plane-parallel layers interconnected by longitudinal webs.

The metal hollow section is produced by extrusion. One can thus easily obtain a hollow section wherein the two metal layers are spaced only a small distance apart.

For high heat transfer from the metal hollow section to the heat carrier, and thus high efficiency of the solar collector, it is necessary that the heat carrier quickly removes the heat of the metal hollow section heated by solar radiation. For the heat carrier to be heated to a maximum temperature, heat must in addition be removed through a minimum quantity of heat carrier. This means that the distance between the two layers of the hollow section should be as small as possible, being smaller than 10 mm if possible, preferably smaller than 5 mm.

In addition, extrusion makes it possible to produce a metal hollow section with very thin layers and thin longitudinal walls, a further precondition for fast heat transfer. The thickness of the two layers and the longitudinal webs of the hollow section portions of the inventive solar collector can be for example 0.1 mm to 1 mm.

In order to reduce the distance between the two layers of the hollow section one according to the invention preferably uses a hollow section which has been subjected after extrusion to deformation, in particular cold forming, e.g. by pressing or rolling. In this way one can produce a metal hollow section wherein the distance between the two layers is only 3 mm or less. The minimum distance between the two layers should be 1 mm, however, since otherwise the flow resistance for the heat carrier greatly increases.

The metal from which the hollow section is produced is preferably an aluminum material, i.e. aluminum or an aluminum alloy. As has turned out, an aluminum material can be extruded and cold-formed especially well into such hollow sections. Also, aluminum is much more cost-effective than copper for example, and much more corrosion-resistant than iron for example.

The longitudinal webs between the two layers of the hollow section increase the heat transfer surface, thereby additionally improving efficiency. However, they are also indispensable because the hollow section would otherwise not have the necessary compressive strength. The operating pressure of the heat carrier is generally several bars.

The metal hollow section has a width of for example 5 cm to 30 cm. The extruded and optionally cold-formed hollow section is cut into portions of a desired length of e.g. 0.5 m to 6 m. The plate-shaped hollow section portions are disposed side by side with their long sides and interconnected so that the heat carrier flows through the hollow section portions in serpentine fashion.

The hollow section portions disposed side by side thus cover virtually the total absorber surface. The inventive solar collector thus has extremely high efficiency with respect to the absorber surface.

The inventive collector can thus also be used for direct heating operation in winter, in particular in conjunction with a heat pump or for regenerating or supporting a horizontal or vertical earth collector. By reason of the high efficiency of the inventive solar collector the insulation on the back of the absorber is not very important, because almost the total surface exposed to solar radiation also simultaneously conducts the heat carrier so that the total absorbed heat must first pass through the heat carrier to be able to emit heat on the back of the solar collector.

The inventive solar collector is in addition relatively light, in particular if it is made of an aluminum material. Also, it has a fast response characteristic. That is, it already produces a relatively large quantity of high-temperature heat carrier after a short period of sunshine.

The heat carrier normally used is furthermore water or a mixture of water with an antifreeze. However, one can also use another liquid or a gas as a heat carrier.

In order to increase the absorption of solar radiation one provides the metal hollow section portions on the side facing the sun with a solar absorbent coating, for example a solar lacquer, plastic coating or, in case of aluminum materials, anodizing or black chromating.

In addition, the hollow section portions can be provided at least on the side facing the sun with a surface-enlarging structure, for example be roughened, e.g. by being blasted with sand or a similar material, or provided with a ribbing. The roughening or ribbing of the surface can be effected by rolling during production of the hollow section. At the same time this can give the inner side of this layer an uneven structure which leads to turbulent flow of the heat carrier in the hollow section. This causes the more greatly heated heat carrier in the area of the inside walls of the hollow section to mix faster with the remaining heat carrier in the hollow section, leading to a further increase in temperature transfer and thus in efficiency.

For this reason at least the layer of the metal hollow section facing away from the sun is preferably provided with a structure causing turbulence in the heat carrier flowing through. This structure can be formed in the hollow section layer facing away from the sun for example by dents, ribs or the like.

On the back of the hollow section a heat insulating layer can further be applied, for example glued or sprayed.

The inventive solar collector is of relatively flat design and therefore has a pleasing appearance. It can be produced from the metal hollow section in virtually any length. It can thus also be used without any architectural problems, e.g. as a facade element.

On each of its two faces the inventive solar collector is preferably provided with a collecting pipe to which the open faces of the hollow section portions are connected.

The collecting pipes are preferably formed by collecting tubes These are provided with longitudinal slots in which the ends of the hollow section portions are tightly fitted, for example by welding or soldering This at the same time give the inventive solar collector a stable, self-supporting structure.

To permit the heat carrier to flow in meandering or serpentine fashion through the hollow section portions disposed side by side, one disposes mutually offset partitions in the two collecting tubes on the two faces of the solar collector.

The partitions can be provided between adjacent hollow section portions. However, they can also be disposed at a greater or smaller distance apart.

The longitudinal webs in the hollow section portions form channels. The longest flow path through the inventive solar collector is thus formed if the partitions are disposed in the collecting pipes such that the heat carrier flows from one channel to the adjacent channel while reversing its direction of flow. However, in particular with small channel cross sections this can high flow resistance, which necessitates an accordingly high pumping capacity.

The partitions in the collecting pipes can consist of disks, stoppers or the like which are pressed into the collecting tubes, for example also of caps similar to crown cork bottle stoppers.

The spaces for the milled or punched longitudinal slots for inserting the hollow section portions into the collecting tubes should be as small as possible, for example 5 mm or less, so that the hollow section portions are as close together as possible with their long sides.

The collecting pipe can also be produced from a tube with a through slot for receiving the ends of the hollow section portions, in which case the slot area of the collecting tubes must be sealed between the hollow section portions.

The inventive solar collector can be used alone with applied heat insulation, e.g. for in-roof installation. This refers to installation in the roof leaving the tile cover open and covering the collector with a glass surface.

However, it can also be disposed in an airtight housing optionally filled with a gas and consisting of a frame of hollow sections connected with angle connectors.

In order for the heat expansion of the frame to correspond as far as possible to the heat expansion of the solar collector disposed therein, the hollow sections of the frame and the hollow section portions of the solar collector are preferably made of the same metal, in particular the same aluminum material.

In the following the inventive solar collector will be described more closely by way of example with reference to the drawing, in which:

FIGS. 1 and 2 show perspective views of an end portion of a hollow section portion for producing the inventive solar collector, from the front facing the sun (FIG. 1) and from the back facing away from the sun (FIG. 2);

FIG. 3 shows a plan view of an embodiment of the solar collector in a shortened representation and with a broken off part of a collecting tube;

FIG. 4 shows a section through the collector of FIG. 3 along line IV—IV;

FIG. 5 shows a plan view of a solar collector disposed in a housing according to another embodiment;

FIG. 6 shows a section through one end of the collector of FIG. 5 along line VI—VI;

FIG. 7 shows part of the housing frame of the embodiment of FIGS. 5 and 6 with a slight modification.

According to FIGS. 1 and 2, extruded plate-shaped metal hollow section portion 1 has two plane-parallel layers 2, 3 disposed at a distance apart and interconnected by longitudinal webs 4. This forms channels 5 between layers 2, 3 and longitudinal webs 4.

According to FIG. 1, layer 2 on the front of hollow section portion 1 facing the sun is provided with ribbing 6 and a black absorption color not shown. Layer 3 on the back of hollow section portion 1 facing away from the sun is provided with dent-like depressions 7 leading to a corresponding deformation on the inner side of the channels, as seen in FIGS. 1 and 2.

Ribbing 6 enlarges the absorption surface for solar radiation. Depressions 7 lead to turbulent flow of the heat carrier in channels 5.

According to FIGS. 3 and 4, solar collector 8 has a plurality of hollow section portions 1 of equal length disposed parallel side by side with their long sides 9. On the two faces of solar collector 8 there are collecting tubes 10, 11 to which the open faces of hollow section portions 1 are connected, i.e. opening into channels 5.

Collecting tubes 10, 11 are provided for this purpose with longitudinal slots 12, 13 into which the ends of hollow section portions 1 are tightly embedded. Longitudinal slots 12, 13 have for this purpose a length corresponding to the width of hollow section portions 1.

Partitions 14 are provided in collecting tubes 10, 11, only one partition 14 being shown in FIG. 3.

Partitions 14 in the two collecting pipes 10, 11 are mutually offset such that the heat carrier flows in meandering or serpentine fashion in accordance with arrow 15 through hollow section portions 1 or channels 5 of solar collector 8 from one end of collecting tube 10, which is provided with connection 16 for the inflow of the heat carrier, to the diametrically opposite end of collecting tube 11, which is provided with connection 17 for the outflow of the heat carrier.

In the embodiment of FIGS. 5 and 6 the solar collector or pipe system 8 through which heat carrier flows in serpentine fashion is disposed in housing 18. The same parts are provided with the same reference numbers as in the embodiment of FIGS. 3 and 4.

Housing 18 consists of frame 19 on which disk 20 made of glass or another at least infrared-transparent material is provided on the side facing the sun, and baseplate 21 is provided on the side facing away from the sun. Glass disk 20 and baseplate 21 are connected airtight with frame 19.

As seen in particular in FIG. 7, frame 19 consists of hollow sections 22 connected with angle connectors 23 which are inserted into the ends of hollow sections 22 and optionally pressed or glued.

According to FIG. 5, rectangular frame 19 consists of four hollow sections 22 and four rectangular connectors 23. Hollow sections 22 and angle connectors 23 are provided on the inside on the side facing the sun with circumferential stepped recess 24 in which glass disk 20 is disposed with its edge through the intermediary of adhesive or similar seal 25.

Base 21 can be glued on, for example. According to FIG. 6 it rests with its edge on inside flange 26 of hollow section 22, and according to FIG. 7 the edge of baseplate 21 is located in circumferential recess 27 in frame 19 like glass disk 20.

According to FIG. 6, heat insulating layer 28, for example of a plastic foam such as PU foam or mineral wool, extends between hollow section portions 1 and base 21 of housing 18.

As seen in FIGS. 5 and 6, frame 19 or hollow sections 22 are provided on the faces of frame 19 with ducts 29, 30 for collecting tubes 10, 11 to connections 16 and 17 for the inflow and outflow of the heat carrier. Collecting tubes 10, 11 extend from solar collector 8 or hollow section portions 1 to connections 16 or 17 via knee or bend 31, 32.

This compensates different heat expansions of frame 19 and hollow section portions 1 in housing 18, in particular preventing linear expansion forces from acting on sealed pipe ducts 29, 30 in frame 19 which can lead to leaks in housing 18 and thus to fogging of glass disk 20.

Collecting pipes 10, 11 can be provided with thread 33, as shown in FIG. 6. Connections 16, 17 for the inflow and outflow of the heat carrier are screwed onto thread 33.

For sealing ducts 29, 30 one can provide inside nut 33 and sealing rings 34, 35 which are disposed on the one hand between screwed-on connection 16 and the outside of hollow section 22 and on the other hand between nut 38 and the inside of hollow section 22 Connection 17 for the outflow of the heat carrier is formed in the same way.

Connections 16, 17 can be equipped with different connectors, for example plug-type connectors, to prevent any confusion of the connections.

Housing 18 can be evacuated or filled with a gas having poorer heat conductivity than air, for example helium. Frame 19 can be provided for this purpose with a valve (not shown) for evacuating or filling housing 18 Further, housing 18 can contain for example within hollow section 22 a moisture-absorbent material, such as silica gel or zeolite granules.

I claim:

1. A solar collector having a pipe system through which a heat carrier flows, the pipe system comprising extruded metal, hollow section portions disposed side by side, the hollow section portions comprising two layers connected by parallel longitudinal webs, open faces of the hollow section portions being interconnected such that the heat carrier flows in a serpentine pattern through the hollow section portions, characterized in that for serpentine flow through the hollow section portions each face of the pipe system supports a tube provided with longitudinal slots in which the open faces of the hollow section portions are embedded, the tubes containing mutually offset partitions, the metal hollow section has been subjected after extrusion to deformation for producing the portions to reduce the distance between the layers to 3 mm or less, and the layer remote from the sun has dent-like depressions causing turbulence in the heat carrier, and the layer facing the sun has a surface-enlarging structure on an outer sun facing side.

2. The solar collector of claim 1, wherein the tubes are connected by at least one bend with the connections for the inflow and outflow of the heat carrier.

3. The solar collector of claim 1, wherein the metal hollow section portions are provided on their side facing the sun with a solar radiation absorbing layer.

4. The solar collector of claim 1, wherein the metal hollow section portions are an aluminum material.

5. The solar collector of claim 1, wherein the pipe system is disposed in a gastight housing comprising a frame, a plate made of an infrared-transparent material on a sun facing side of the frame, and a base on the other side of the frame.

6. The solar collector of claim 5, wherein the frame has hollow sections connected with angle connectors.

7. The solar collector of claim 6, wherein the hollow sections of the frame are made of the same metal as the hollow section portions of the pipe system.

8. The solar collector of claim 5, wherein the frame has a recess on the sun facing side for receiving the plate made of infrared-transparent material.

9. The solar collector of claim 5, wherein the housing contains a moisture-absorbent material.

10. The solar collector according to claim 1, wherein the layer facing the sun has an uneven inner side, the inner side facing the layer remote from the sun.

11. The solar collector according to claim 10, wherein the hollow section portions are elongate and are disposed longitudinally side-by-side.

12. The solar collector according to claim 1, wherein the partitions divide the tubes into heat carrier flow paths which direct the heat carrier into the hollow section portions.

* * * * *